March 30, 1965 T. B. DELLINGER 3,175,628
SYSTEM FOR INCORPORATING ADDITIVES IN DRILLING FLUIDS
Filed Dec. 11, 1961 3 Sheets-Sheet 1

THOMAS B. DELLINGER INVENTOR.

BY James E. Reed
ATTORNEY

March 30, 1965 T. B. DELLINGER 3,175,628
SYSTEM FOR INCORPORATING ADDITIVES IN DRILLING FLUIDS
Filed Dec. 11, 1961 3 Sheets-Sheet 2

THOMAS B. DELLINGER INVENTOR.

BY James E. Reed
ATTORNEY

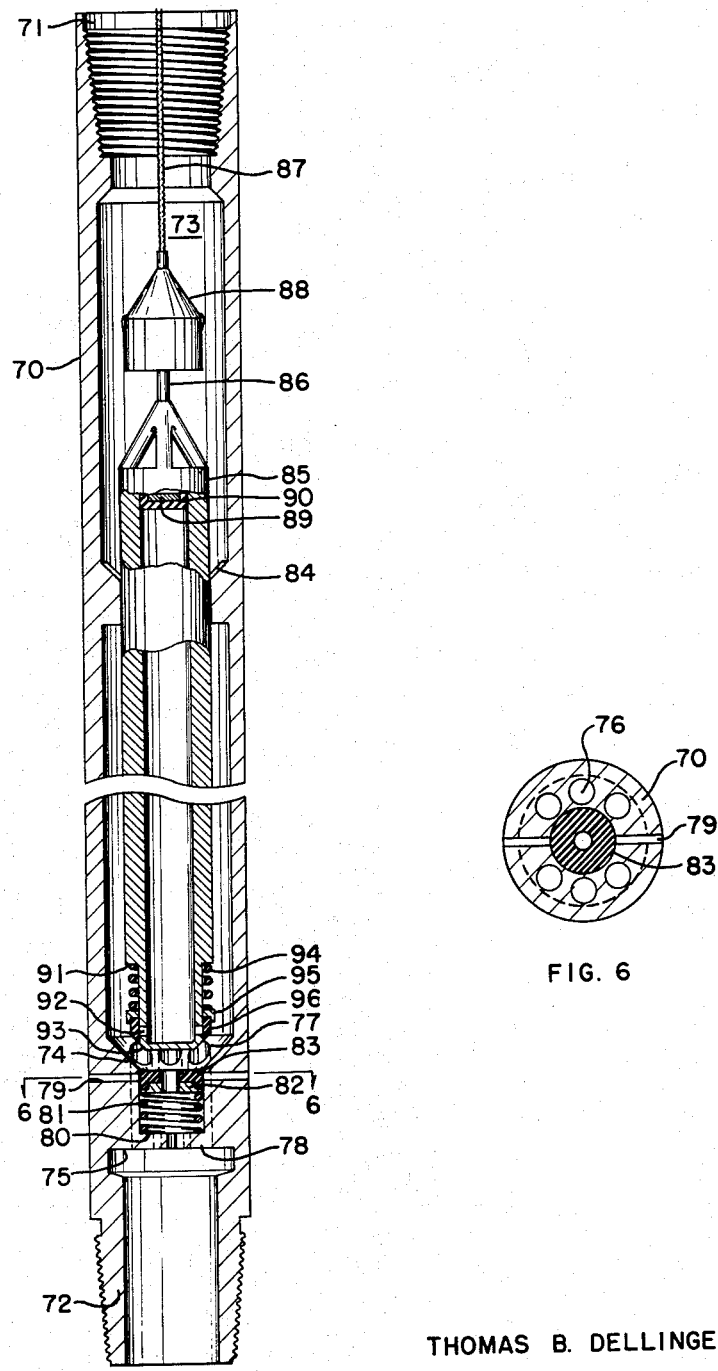

3,175,628
SYSTEM FOR INCORPORATING ADDITIVES IN DRILLING FLUIDS
Thomas B. Dellinger, Tulsa, Okla., assignor to Jersey Production Research Company, a corporation of Delaware
Filed Dec. 11, 1961, Ser. No. 158,497
5 Claims. (Cl. 175—72)

The present invention relates to the drilling of oil wells, gas wells and similar boreholes and more particularly relates to an improved drilling system which permits more effective use of flocculants and other drilling fluid additives than systems available in the past.

The properties of the drilling fluid have a pronounced effect upon the penetration rates obtained in drilling oil wells, gas wells and similar boreholes. Experience has shown that a fluid having a low density, a low viscosity and a high instantaneous filter loss will generally permit substantially higher rates than can be obtained with a conventional "mud" containing bentonite and other suspended solids. Water and brine are often used to secure such rates in drilling operations which require that a column of liquid be maintained in the borehole but do not necessitate the use of a heavy mud to control formation pressures. A problem frequently encountered in such operations is that of preventing the accumulation of solids in the fluid in quantities sufficient to affect its density, viscosity and filter loss characteristics. One approach to this problem has been to use a wet cyclone, a decanting-type centrifuge or a similar mechanical device to remove finely-divided solids from the fluid. Another approach has been to use additives designed to retard hydration of the solids. A third approach has been to employ flocculating agents for removal of the solids.

At present, the use of flocculating agents is by far the most satisfactory of the three methods referred to above. It has been shown that the addition of a small amount of a partially-hydrolyzed polyacrylamide or similar flocculating agent to a drilling fluid containing suspended solids will result in agglomeration of the solids, facilitating their removal from the fluid at the surface. Flocculants may also produce a significant reduction in fluid losses from the borehole annulus and may thus make possible the use of a low-solids fluid in operations where such losses might otherwise dictate the use of a viscous mud. The difficulty in using materials is that much of the flocculating agent is spent in the drill string because of the presence of some solids in the liquid stream circulated from the surface. This generally necessitates addition of the flocculants in concentrations considerably higher than might otherwise be required. Moreover, the flocculants and agglomerated solids discharged beneath the bit reduce fluid penetration into the exposed formation and thus have an adverse effect on drilling rates.

It is therefore an object of the present invention to provide a more effective system for utilizing flocculating agents and other additives to control the properties of fluids employed in drilling wells and similar boreholes. A further object is to provide an improved drilling system which will permit the use of flocculating agents and similar additives in the borehole annulus without adversely affecting the action of the drill bit. Still another object is to provide improved apparatus for the injection of additives into the drilling fluid as it is circulated. Other objects will become apparent as the invention is described in greater detail hereafter.

In accordance with the invention, it has now been found that flocculating agents and similar drilling fluid additives can be used much more effectively by introducing them into the drilling fluid in the borehole annulus. The injection of water, brine or similar fluid having a low density, a low viscosity and high instantaneous filter loss characteristics into the borehole through the drill string and the separate introduction of a flocculant or similar additive into the fluid after it has emerged from beneath the bit permits use of the additive to modify properties of the annulus fluid without adversely affecting action of the bit. Difficulties due to premature reaction of the additive with solids in the fluid are avoided. The amount of flocculating agent required to remove solids and reduce fluid losses in the annulus is minimized. These and other advantages over conventional systems make the system of the invention attractive in many drilling operations.

The drilling fluid utilized in carrying out the process of the invention and the additive employed to flocculate solids or improve properties of the fluid in the borehole annulus will depend primarily upon the subsurface conditions encountered during the drilling operation. In most instances water or brine will be circulated through the drill bit in order to secure high drilling rates and a solution or suspension containing a synthetic polymer or similar compound having the ability to flocculate solids when present in low concentrations will be discharged into the annulus just above the bit to flocculate solids and reduce fluid losses. In other cases, polymers which are not effective flocculants but will reduce fluid losses, increase viscosity or alter other properties may be used. Polymers which in the proper concentrations are suitable for these purposes include partially hydrolyzed polyacrylamides, polyacrylic acid, copolymers of polyacrylamide and polyacrylic acid, polyethyleneoxide, sulfonated polystyrene, sulfonated copolymers of styrene and vinyl toluene, sodium carboxymethyl cellulose, polyvinyl alcohol, hydrolyzed polyacrylonitrile, guar gum, and the like. These and similar materials which in low concentrations will flocculate suspended solids, reduce fluid losses or otherwise improve fluid properties in the borehole annulus are available commercially and will therefore be familiar to those skilled in the art.

The additive utilized to flocculate solids or modify properties of the drilling fluid after the fluid emerges from beneath the drill bit may be incorporated into the fluid by means of a down-hole assembly containing a chamber or reservoir from which the additive materials are discharged into the annulus. One embodiment of such apparatus contains an axial passageway surrounded by an annular chamber or reservoir. An inlet to the reservoir from the axial passage is located in the upper end of the assembly and an outlet to the annulus is provided near the lower end. An annular piston slides within the reservoir between the inlet and outlet. Drilling fluid admitted through the inlet above the piston forces it downwardly in the reservoir during the drilling operation. The piston displaces the additive contained in the lower part of the reservoir, forcing it through the outlet into the annulus above the bit. Turbulence in the drilling fluid as it flows upwardly in the annulus results in rapid dispersion of the injected material and hence the fluid properties required in the annulus can be quickly attained.

An alternate and frequently preferred apparatus comprises a sub into which a container filled with an additive may be dropped or lowered through the drill string on a wire line. Seating of the container in the sub results in the opening of connecting ports through which the additive is discharged into the annulus. A piston in the container actuated by pressure of the drilling fluid may be utilized to displace the additive. This apparatus is particularly advantageous in that it permits replacement of the container and replenishment of the additive without interrupting the drilling operation nad making a trip to the surface.

The drilling fluid pumped to the surface through the borehole annulus may be treated to remove the additive if necessary and may then be recirculated. In most cases the additive will be spent within the bore hole and hence no treatment for its removal will be required. Flocculants can generally be removed by simply adding sand or a similar solid to which the flocculant molecules will readily adhere. Other additives can be eliminated prior to recirculation of the fluid by changing the pH, by adding chemicals, by passing the fluid through settling tanks, or by a combination of these procedures. The method utilized will depend upon the particular additives injected within the borehole.

The nature and objects of the invention can be more fully understood by referring to the following detailed description of a preferred embodiment of the invention and to the accompanying drawing, in which:

FIGURE 5 is an elevation, partially in section, of a down-hole sub and wire line container which may be used to inject additives into the borehole annulus; and, FIGURE 6 is a cross-sectional view of the apparatus of FIGURE 5 taken about the line 6—6.

Figure 1:
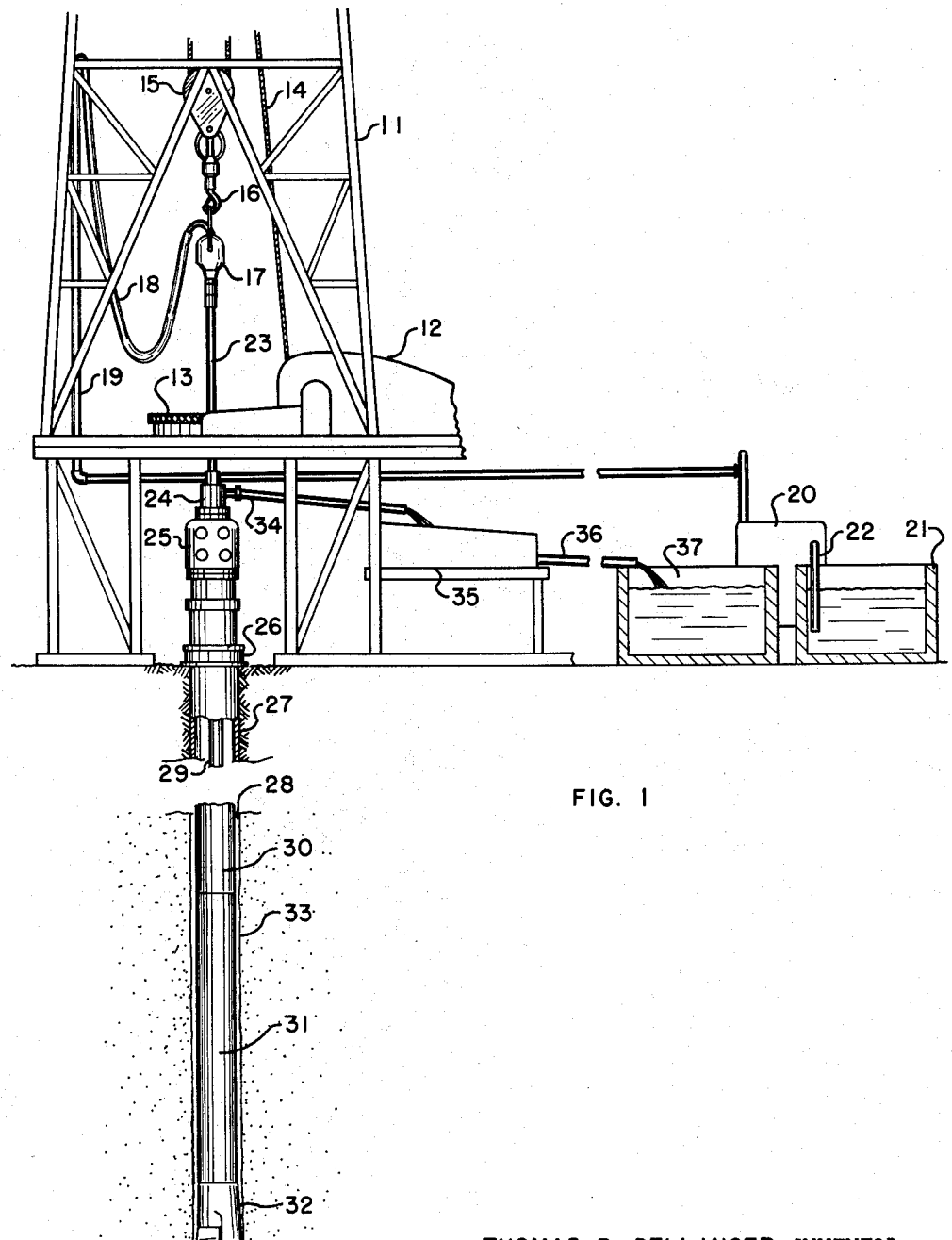
FIGURE 1 depicts a rotary drilling rig and associated equipment including a down-hole assembly for the injection of additives into a drilling fluid after the fluid has emerged from beneath the drill bit.

The rotary drilling rig depicted in FIGURE 1 of the drawing may be of conventional design and includes a derrick 11, a draw-works 12, and a rotary table 13. Cable 14 extends from the draw-works to a crown block at the top of the derrick which is not shown in the drawing and is used to support traveling block 15 to which hook 16 is attached. Swivel 17 is supported from the hook. A hose 18 extends from the inlet side of the swivel to supply line 19 which is in turn connected to the discharge side of pump 20. The pump supplies drilling fluid to the system from tank 21 through intake line 22. Kelly 23 is connected to the swivel outlet and extends through the rotary table on the rig floor to permit rotation of the drill string. A riser 24, a blow-out preventer 25 and a landing flange 26 are mounted beneath the rig floor above surface pipe 27 which extends into boreohle 28. Drill pipe 29 is connected to the lower end of the kelly and passes downwardly through the riser, blow-out preventer, landing flange and surface pipe. Drill collars 30 of conventional design are connected to the lower end of the drill pipe to supply the weight required for effective rotary drilling. Down-hole assembly 31, to be described in greater detail hereafter, is attached to the lowermost drill collar and supports a rotary bit 32. Drilling fluid circulated through the drill string emerges beneath the bit through nozzles which are not shown in the drawing.

The drilling fluid discharged into the borehole through the bit nozzles flows upwardly through the annular section of the hole between the drill string and the surrounding formation 33. Additives required to modify properties of the drilling fluid are injected into the annulus from assembly 31 at a point just above the bit. The modified fluid and entrained cuttings reaching the surface are discharged from the annulus through line 34 in the riser. The discharge fluid and cuttings are passed to a vibratory screen or similar unit 35 where the larger cuttings are separated from the fluid. The fluid then passes through line 36 to processing tank 37 where additives and finer particles remaining in the fluid may be removed. The processed fluid is then passed to tank 21 to be recirculated.

Figures 2, 3, 4:
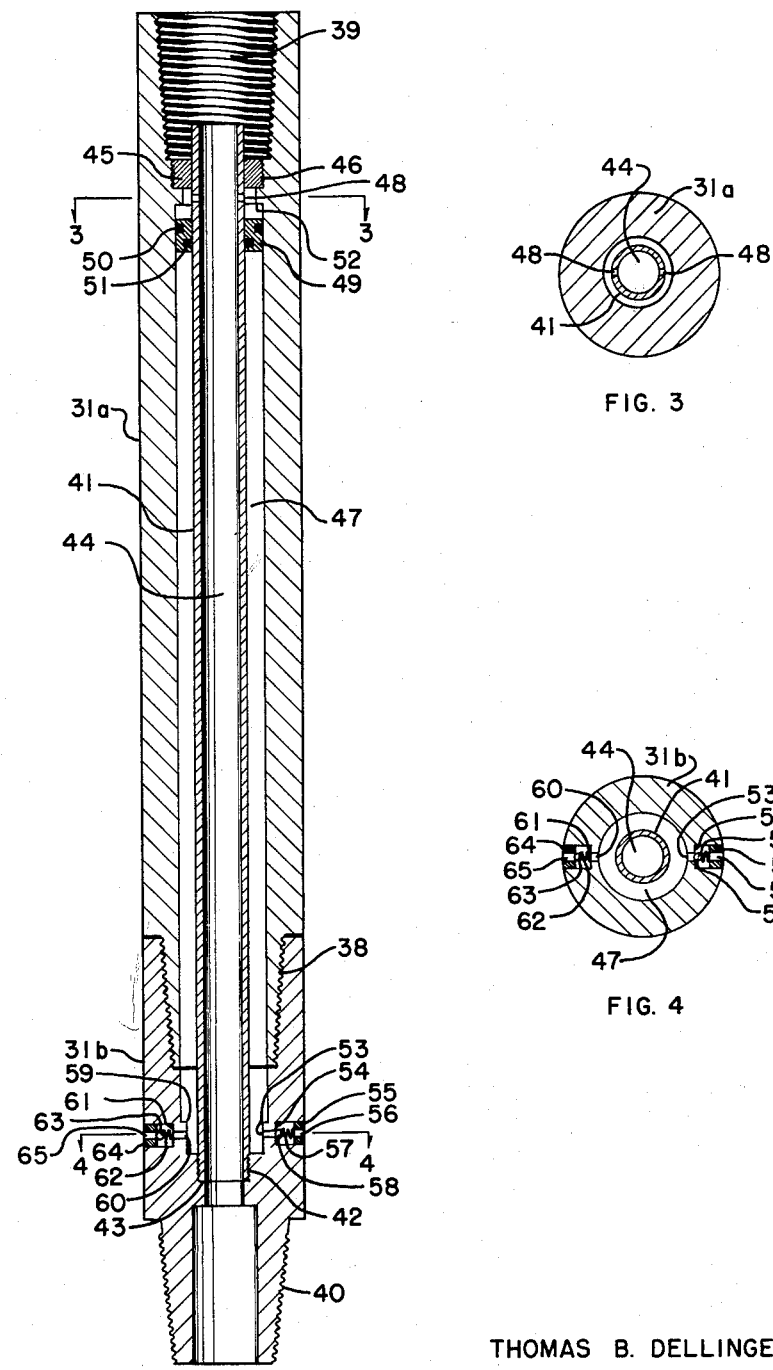
FIGURE 2 is an enlarged view, partially in section, of the down-hole assembly shown in FIGURE 1.
FIGURE 3 is a cross-sectional view of the apparatus of FIGURE 2 taken about the line 3—3 in FIGURE 2.
FIGURE 4 is a cross-sectional view of the assembly of FIGURE 2 taken about the line 4—4 in FIGURE 2.

The down-hole assembly 31 which is referred to above is shown in greater detail in FIGURES 2, 3 and 4 of the drawing. As can be seen from FIGURE 2, the apparatus includes a tubular steel outer member or housing divided into an upper section 31a and a lower section 31b in order to permit ready access to all parts of the apparatus. The upper and lower sections are connected to one another by threads or similar means 38. A standard A.P.I. tool joint box 39 and an A.P.I. tool joint pin 40 are provided at the upper end of section 31a and at the lower end of section 31b respectively in order to permit connection of the assembly within a rotary drill string. A tubular liner 41 is threaded into the lower section of the housing by means of threads 42 and seats against shoulder 43 near the lower end of the assembly. The liner and lower part of section 31b form an axial passage 44 which extends from box 39 through the assembly. An annular spacer 45 is mounted on the liner near its upper end and is connected by means of threads 46 into the upper part of section 31a in order to hold the liner in place. The liner and housing thus define an annular reservoir 47 which extends over substantially the entire length of the assembly. Inlet ports 48 in the liner are located a short distance below the spacer to permit the entry of drilling fluid from passage 44 into the reservoir. An annular piston 49 is positioned within the chamber reservoir below the port. Piston rings 50 and 51 assure a fluid tight seal between the piston and walls of the reservoir. Shoulder 52 on the inner wall of upper section 31a limits upward movement of the piston and prevents closing off of the inlet ports. The inlet ports are shown more clearly in FIGURE 3 of the drawing.

Outlet port 53 is located in the lower section 31b of the assembly. The outlet port extends through the housing wall near the lower end of the assembly to permit the discharge of fluid from reservoir 47 into the borehole annulus surrounding the drill string. The port includes an internal shoulder 54 which faces toward the annulus. A ring 55 containing an orifice 56 is threaded or otherwise held within the port near the outer surface of the tool. Coil spring 57 bears against ring 55 and holds ball 58 over port 53. The ball and spring thus act as a check valve to prevent back flow of fluid from the borehole into reservoir 47. The size of the port and the spring employed will depend primarily upon the fluid injection rate required under normal drilling conditions, the viscosity of the fluid to be injected, and the pressure drop across the drill bit. The port size and the spring constant required for the injection of a particular fluid under normal conditions can readily be calculated. Check valves other than the ball and spring type shown may be used if desired. An annular shoulder 59 or similar projection on the inner wall of lower section 31b above the outlet port limits downward movement of the piston and prevents closing off of the port by the piston.

A filler port 60 is provided near the lower end of the assembly to permit injection of the additive solution into reservoir 47 below the piston. Shoulder 61 within the port supports coil spring 62. The spring forces ball 63 outwardly against ring 64 to cover orifice 65, thus preventing back-flow from the reservoir into the annulus. The spring may be selected so that less pressure is required to open the filler port than is needed to open the outlet port and hence the outlet port will remain closed as the additive fluid is injected into the reservoir. Alternatively, a plug may be inserted in the outlet port during the filling operation. The filler and outlet ports are shown in cross-section in FIGURE 4 of the drawing.

The required capacity of the reservoir in the assembly shown is determined by the rate at which the additive is to be injected into the drilling fluid and the time interval over which such injection must be continued. The capacity will preferably be sufficient to permit continuous injection of the additive during the useful life of the drill bit, thus minimizing the number of trips which must be made to and from the surface. Additives suitable for purposes of the invention are normally injected at rates from about 0.01 to about 5 lbs. per hour. Since a normal bit run generally lasts from about 10 to about 18 hours, a capacity less than 100 lbs. of the additive will ordinarily be sufficient. Additional capacity may be required, however, where a mixture of several additives is to be used or where the additive is a solid which must be suspended in a liquid carrier. The reservoir capacity required under particular conditions can be readily calculated.

In utilizing the apparatus described above, the assembly reservoir 47 is first filled with the additive material to be employed. If the additive is a liquid, it may be introduced directly into the reservoir through filler port 60 by pumping it from a suitable storage vessel. If a solid, the material may be dispersed as a fine powder in a non-wetting liquid to produce a smooth slurry having a high solids content and then injected into the apparatus. It is generally preferred that the non-wetting liquid selected be one which is miscible with the drilling fluid utilized. A low molecular weight alcohol such as ethanol may, for example, be used to produce a slurry containing a water-soluble flocculating agent which can subsequently be injected into the borehole annulus to obtain uniform dispersion of the flocculating agent in water or brine. An alternate procedure is to produce an emulsion in which the additive is contained in droplets of kerosene or a similar hydrocarbon liquid dispersed in water. The procedure selected will, of course, depend in part upon the additive utilized.

A typical additive fluid may consist of a kerosene slurry containing about 25 percent by weight of a flocculant prepared by the sulfonation of polystyrene. Such flocculating agents are desired in British Patent 812,228 and elsewhere in the literature. The polymer may be injected into water in a concentration of from about 1 to about 20 parts per million in order to flocculate suspended solids during a drilling operation. A water circulation rate in the borehole of about 10 barrels per minute and a polymer injection rate of about 10 parts per million will require the use of about 21 pounds of polymer or about 84 pounds of the slurry during a 10 hour bit run.

As the reservoir in the assembly is filled, piston 49 is forced upwardly from its initial position adjacent lower shoulder 59 until it engages upper shoulder 52. The filler port may be plugged if desired after the additive has been injected into the reservoir. The filled assembly is connected into the drill string at a point just above the drill bit and is lowered into the borehole in the position shown in FIGURE 1 of the drawing. The water employed as the drilling fluid is withdrawn from tank 21 by means of pump 20 and is circulated into the borehole through the drill string. The fluid is discharged beneath the bit and flows upwardly into the annulus between the drill string and the borehole wall. Because of the pressure drop across the lower portion of the assembly and the drill bit, the pressure within passage 44 in the dispenser will be considerably higher than that in the borehole annulus. Fluid will flow through the inlet ports 48 into reservoir 47 above piston 49. The pressure exerted on the piston forces it downwardly in the reservoir at a rate sufficient to discharge the additive fluid into the annulus in the required concentration. The additive from the outlet port is rapidly dispersed in the fluid as the drill string rotates. The dispersed material increases the viscosity and solids content of the water, permitting more sufficient entrainment of cuttings and better sealing of the borehole wall than could otherwise be attained. The circulation rate may be varied to change the pressure drop across the bit and thus vary the rate at which the additive is discharged into the annulus. Drilling may be commenced as soon as a suitable fluid circulation rate has been established.

The modified fluid and entrained cuttings conducted to the surface through the borehole annulus flows from riser 24 through line 34 to screen 35 where the larger cuttings are removed. The fluid is then discharged into processing tank 37 where the smaller cuttings settle out and a small amount of sand or other solid may be added to remove any remaining polymer. The supernatant liquid is withdrawn from tank 37 and conducted to tank 21 from which it is recirculated. Drilling is continued until it becomes necessary to change the drill bit or refill the reservoir in the assembly, at which time circulation is halted. The drill string is withdrawn from the borehole, the bit is replaced, and, if necessary, the reservoir in the assembly is refilled. The apparatus may then be lowered back into the hole to permit resumption of the drilling operation.

It will be apparent from the foregoing that the invention permits the use of an additive to modify properties of the fluid in the borehole annulus without the necessity for passing the additive through the drill string. The use of water, brine or the like in the vicinity of the drill bit permits rapid penetration of fluid into the formation beneath the bit and avoids the formation of a filter cake on the exposed formation, both of which contribute to higher drilling rates. Reduced friction losses within the drill string and better flushing of cuttings from beneath the bit due to absence of the additive from the fluid circulated through the string permit lower pump pressures and slower circulation rates than might otherwise be required. The presence of the polymeric additive in the borehole annulus reduces fluid losses, results in better entrainment of cuttings in the annulus fluid, and permits the recovery of cuttings more susceptible of geological interpretation.

In lieu of the assembly described above, the apparatus shown in FIGURES 5 and 6 of the drawing may be employed for injection of the additives into the borehole annulus. As can be seen from FIGURE 5, the apparatus depicted includes a tubular sub 70 provided with a standard API tool joint box 71 at its upper end and an API tool joint pin 72 at its lower end. The sub may thus be connected into a drill string at a point just above the bit. A passageway 73 extends through the tool to permit the downward circulation of drilling fluid. An upper shoulder 74 which slopes inwardly toward the lower end of the sub is located within the tool a short distance above pin 72. A lower shoulder 75 facing the pin is located below the upper shoulder. Branch passageways 76 extend from ports 77 in the upper shoulder to ports 78 in the lower shoulder so that fluid may bypass passageway 73 between the two shoulders. The branch passageways are shown more clearly in FIGURE 6 of the drawing.

Passageway 73 between shoulders 74 and 75 forms a seat into which the wire line container employed may be lowered through the drill string. Lateral ports 79 extend through the wall of the sub above an internal shoulder 80. As can be seen from FIGURE 6, the lateral ports pass between the branch passageways in the apparatus. Only two lateral ports are shown but it will be understood that a greater number may be provided if desired. Coil spring 81 is positioned on internal shoulder 80 and supports an annular member 82. The outer and upper surfaces of the annular member are covered with rubber or a similar material 83 to provide a seal between the member and the surrounding sub. The annular member serves as a valve to close off ports 79 and is held in a normally closed upward position by the coil spring.

The spring should have sufficient strength to keep the valve closed as fluid passes downwardly through the opening in the annular member. Segmented guide 84 above the upper shoulder in the sub centers the wire line container as it is lowered into place.

The wire line container employed to hold the additive injected with the apparatus is shown in FIGURE 5 as it is being lowered into place. The container comprises an elongated cylindrical vessel 85 which is closed at its lower end. A spear 86 is located at the top of the vessel and a wire line 87 is connected to the spear by means of overshot 88. A piston 89 surfaced with rubber or similar material 90 to provide a fluid-tight seal against the inner wall of the vessel is shown positioned a short distance below the spear. This piston may be removed from the vessel to permit it to be filled with an additive material and may move downwardly within the vessel. In lieu of a piston as shown, a spring loaded piston or other means for forcing the additive from the container may be provided.

A shoulder 91 which faces downwardly is located near the lower end of vessel 85. Discharge ports 92 extend laterally through the vessel wall below this shoulder. A beveled edge 93 is provided at the bottom of the vessel to facilitate its being lowered into the restricted section of passageway 73 in the sub. Coil spring 94 extends downwardly around the vessel from shoulder 91. Ring 95 is attached to the lower part of spring 94 and is surfaced with rubber or a similar material 96 to provide a seal between the ring and the outer surface of the vessel. Spring 94 holds ring 95 in a normally downward position over ports 92 so that no additive can escape from the vessel until the ring is displaced. The rubber-covered lower surface of the ring is tapered to seat against and form a fluid tight seal on tapered shoulder 74 in the sub. The dimensions of the lower portion of vessel 85 and the restricted section of passageway 73 in the sub are such that ports 92 in the vessel and ports 79 in the sub communicate when the container is lowered into place.

In utilizing the apparatus shown in FIGURES 5 and 6, the operator first fills vessel 85 in the wire line container with the additive to be injected into the borehole annulus during the drilling operation. Assuming that the drill string has already been lowered into the borehole with the sub 70 in place just above the bit, the container is then dropped into place or lowered through the string at the lower end of a wire line. Tapered shoulder 74 in the sub deflects the lower end of the container into the restricted section of passageway 73. The bottom of the container contacts the upper surface of annular member 82, forcing it downwardly and compressing spring 81. Ports 79 in the sub are thus uncovered. At the same time, ring 95 seats against shoulder 74 and moves upwardly with respect to vessel 85, compressing spring 94. This uncovers ports 92 in the vessel, establishing communication between the interior of the vessel and the borehole annulus. Ring 95 and annular member 82 form a seal between the vessel and sub above and below the ports. If a wire line is used to lower the container, it is removed after the container is seated.

After the wire line container has been positioned as described above, drilling fluid is circulated downwardly through the drill string. The fluid flows around the container through the open spaces in guide 84, passes through the branch passageways 76, and is discharged from the bit connected beneath the sub. The pressure exerted by the fluid against piston 89 exceeds the pressure within vessel 85 because of the pressure drop across the lower part of the assembly and drill bit. The piston therefore moves downwardly in the vessel, displacing the additive into the borehole annulus. The resistance offered by springs 81 and 94 to further movement of annular member 82 and ring 95 prevents leakage of the additive as it is forced from the ports in the vessel into the ports in the sub. Turbulence in the drilling fluid in the annulus results in rapid and effective dispersion of the additive into the fluid. Drilling may be commenced as soon as fluid circulation has been established.

When the supply of additive in the wire line container has been exhausted, the container is raised to the surface and refilled. The spring 81 in the sub forces annular member 82 into position over ports 79, thus preventing drilling fluid from bypassing the bit. Circulation may be continued while the container is being refilled in order to prevent settling of cuttings in the borehole annulus. The container may be lowered back into position as soon as it has been filled and drilling may then be resumed. As pointed out earlier, the ability to replenish the additive supply without pulling the drill string is a particular advantage of this apparatus. This permits the use of higher additive concentrations than are sometimes practical with apparatus which require that the drill string be pulled in order to replenish the additive.

The invention has been described above with reference to a rotary drilling system in which the drill string is rotated from the earth's surface but it will be apparent that it may be employed with any drilling system in which a stream of drilling fluid is circulated downwardly through a drill string and returned to the surface through the borehole annulus. Other systems include those utilizing a down-hole turbine and those in which a fluid-operated percussive tool is employed. In like manner, a variety of additives in addition to those specifically mentioned may be injected into the borehole annulus in order to modify properties of the drilling fluid. A number of modifications to the apparatus shown in the drawing will suggest themselves to those skilled in the art. It is therefore intended that the invention be limited only by the scope of the appended claims.

What is claimed is:

1. In a drilling operation wherein an aqueous drilling fluid is passed downwardly through a hollow drill string within a borehole in the earth, discharged beneath a drill bit at the lower end of said drill string, and passed upwardly through the annulus between said drill string and the borehole wall, the improvement which comprises providing a reservoir of drilling fluid additive within said drill string near the lower end thereof, said reservoir being isolated from said drilling fluid passing downwardly through said drill string, and discharging said additive from said reservoir into the borehole annulus at a point above said bit in response to fluid pressure within said drill string as said drilling operation progresses, said additive being discharged in quantities sufficient to improve the performance of said aqueous drilling fluid after said fluid emerges from beneath said bit.

2. A method as defined by claim 1 wherein said additive is a flocculant.

3. A method as defined by claim 1 wherein said additive is a fluid loss control agent.

4. In a drilling operation wherein a drill bit connected at the lower end of a hollow drill string is actuated in contact with the formation at the bottom of a borehole in the earth, the improvement which comprises passing an aqueous drilling fluid having a low viscosity and a high instantaneous fluid loss downwardly through said hollow drill string, discharging said fluid into said borehole beneath said bit, injecting a drilling fluid additive having the ability to increase the viscosity and reduce the instantaneous fluid loss of said drilling fluid from an isolated reservoir in said drill string into the annular space between said drill string and the borehole wall at a point above but in the vicinity of said bit, and passing said additive and drilling fluid emerging from beneath said bit upwardly through said annular space.

5. A method as defined by claim 4 wherein said drilling fluid is an aqueous liquid and said additive is an organic polymer.

(References on following page)

References Cited by the Examiner

UNITED STATES PATENTS

| | | | |
|---|---|---|---|
| 1,324,304 | 12/19 | Carmichael | 175—205 |
| 2,019,719 | 11/35 | Miller | 175—320 X |
| 2,195,752 | 4/40 | O'Brien | 175—70 X |
| 2,461,164 | 2/49 | Lewis | 175—42 X |
| 2,842,338 | 7/58 | Davis | 175—65 X |
| 2,867,584 | 1/59 | Scott | 175—72 X |
| 2,920,872 | 1/60 | Baur | 175—324 X |
| 2,951,680 | 9/60 | Camp | 175—72 X |
| 2,994,378 | 8/61 | Reistle | 166—72 |
| 3,020,961 | 2/62 | Orr | 166—169 X |

CHARLES E. O'CONNELL, *Primary Examiner.*

BENJAMIN BENDETT, *Examiner.*